Jan. 19, 1960     B. HOELZER     2,921,773
CRAFTSMAN'S ADJUSTABLE PRY BAR
Filed March 19, 1958
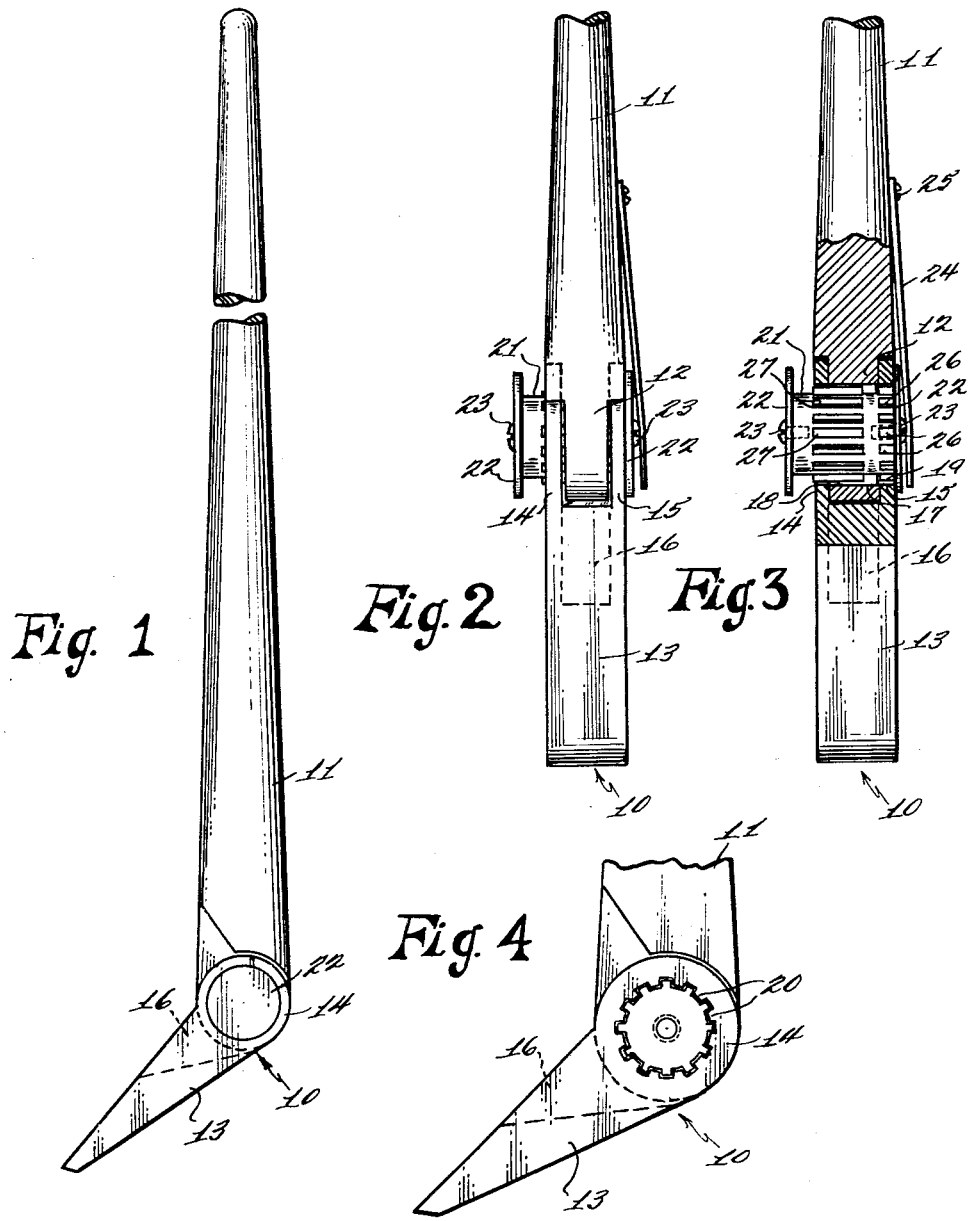
INVENTOR.
BRUCE HOELZER
BY
*Kimmel & Crowell*
ATTORNEYS 2,921,773
CRAFTSMAN'S ADJUSTABLE PRY BAR
Bruce Hoelzer, Chicora, Pa.
Application March 19, 1958, Serial No. 722,422
3 Claims. (Cl. 254—129)

The present invention relates to craftsmen's adjustable pry bars, and particularly to such tools wherein the pry point and handle can be angularly adjusted with relation to each other.

The primary object of the invention is to provide an adjustable pry bar for craftsmen in which the pry point is locked to the handle positively at each point of adjustment.

Another object of the invention is to provide a tool of the class described above in which the handle and pry point are releasably locked together by a plurality of transversely movable teeth.

A further object of the invention is to provide a craftsman's adjustable pry bar in which the adjustment can be easily made without tools, and the device is constructed so as to be inexpensive to manufacture, and completely effective in its action.

Other objects and advantages will become apparent in the following specification when considered in the light of the attached drawings, in which:

Figure 1 is a fragmentary side elevation of the invention.

Figure 2 is a fragmentary rear elevation of the invention.

Figure 3 is a view similar to Figure 2, shown partially broken away and in section for convenience of illustration.

Figure 4 is an enlarged fragmentary side elevation with the end cap removed.

Referring now to the drawings in detail wherein like reference characters indicate like parts throughout the several figures, the reference numeral 10 indicates generally a craftsman's adjustable pry bar constructed in accordance with the invention.

The pry bar 10 includes an elongated tapered handle 11 having a reduced cross-section integral ear 12 formed on its lower end as can be best seen in Figures 2 and 3. A pry point 13 of general wedge shape is provided with a pair of bifurcated ears 14, 15 arranged in spaced parallel relation on opposite sides of the ear 12.

The pry point 13 is slotted at 16 to permit the pry point 13 to be rotated about the ear 12 through a relatively wide arc. The ear 12 and the ears 14, 15 are provided with transversely extending aligned bores 17, 18 and 19, respectively, which are each provided with a plurality of teeth 20.

A cylindrical barrel 21 is arranged in the bores 17, 18 and 19 and is provided at its opposite ends with end caps 22 detachably secured to the barrel 21 by means of securing elements 23. A flat spring 24 is secured to the handle 11 by a securing element 25 and bears against the cylindrical barrel 21 at one end thereof to normally bias the cylindrical barrel 21 in a direction away from the ear 15 toward the ear 14.

The cylindrical barrel 21 is provided with a plurality of teeth 26 at one end thereof adjacent the ear 15 with the teeth 26 having a transverse length such as to engage only in the teeth 20 in the bore 19 when the cylindrical barrel 21 is in its innermost position with respect to the ear 14. Spaced from the teeth 26, in aligned relation therewith, are a plurality of relatively elongated teeth 27 secured to the cylindrical barrel 21 and arranged to engage the teeth 20 in the bore 17 and the bore 18 when the cylindrical barrel 21 is in its innermost position with respect to the ear 14.

The length of the teeth 27 and the length of the teeth 26 are such that when the cylindrical barrel 21 is moved in the opposite direction toward the ear 15, the teeth 27 mesh only with the teeth 20 in the bore 17 and the teeth 26 disengage from the teeth in the bore 19 so that the pry point 13 may turn on the cylindrical barrel 21 with respect to the handle 11. The cylindrical barrel 21 serves both as a pivot for the movement of the pry point 13 as well as a device for releasably locking the pry point 13 to the handle 11.

It can readily be seen that the teeth 26 and the teeth 27 cooperating with the teeth 20 can releasably lock the pry point 13 to the handle 11 in a great plurality of adjusted positions to permit the pry point 13 to be used for a great number of prying operations in the work of craftsmen such as carpenters, auto mechanics, and the like.

Having thus described the preferred embodiment of the invention, it should be understood that numerous structural modifications and adaptations may be resorted to without departing from the scope of the appended claims.

What is claimed is:

1. A pry bar comprising an elongated handle, an ear integrally formed on one end of said handle, a pry point, a pair of spaced parallel ears formed on said pry point, said spaced parallel ears on said pry point engaging on opposite sides of said ear on said handle, said ears each having a central bore extending therethrough with the bores arranged in axially aligned relation, a plurality of transversely extending teeth formed in each of the bores of each of the ears, a cylindrical barrel positioned in said bores for transverse sliding movement therein, said barrel having a length in excess of the total length of said bores, an end cap having a diameter greater than said barrel detachably secured to opposite ends of said barrel to retain said barrel in said bores, resilient means on said pry bar engaging and biasing said barrel in one direction in said bores, and a plurality of transversely extending teeth formed on said barrel for engagement with the teeth of said bores in said ears to releasably lock said pry point to said handle, said teeth on said barrel being arranged in a pair of axially spaced rows positioned so that all of the teeth on said barrel when said barrel is moved to its limit in the other direction against the tension of said resilient means are disengaged from the teeth in the bores in the pry point ears to permit the pry point to be rotatably adjusted about said cylindrical barrel.

2. A device as claimed in claim 1 wherein resilient means comprises a flat spring bar having one end secured to said handle and the opposite end resiliently bearing against one end of said barrel.

3. A device as claimed in claim 1 wherein teeth on said barrel arranged in axially spaced rows have one row of teeth with an axial length more than twice the axial length of the other row of teeth and the space between said rows of teeth substantially equal to the axial length of said other row of teeth, said one row of teeth with said barrel biased in said one direction engaging the teeth of one of the ears on said pry point and the teeth on the ear on said handle, said other row of teeth simultaneously engaging the teeth on the other of the ears on the pry point.

References Cited in the file of this patent
UNITED STATES PATENTS
641,118    Kelly ------------------ Jan. 9, 1900
2,189,480  Tessier ---------------- Feb. 6, 1940